(12) United States Patent
Nielsen et al.

(10) Patent No.: US 12,540,597 B2
(45) Date of Patent: Feb. 3, 2026

(54) SPAR CAP WITH TAPERING AND SERRATED END SECTION

(71) Applicant: LM WIND POWER A/S, Kolding (DK)

(72) Inventors: Lars Nielsen, Kolding (DK); Klavs Jespersen, Kolding (DK)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/563,139

(22) PCT Filed: Jun. 24, 2022

(86) PCT No.: PCT/EP2022/067375
§ 371 (c)(1),
(2) Date: Nov. 21, 2023

(87) PCT Pub. No.: WO2022/269048
PCT Pub. Date: Dec. 29, 2022

(65) Prior Publication Data
US 2024/0247636 A1    Jul. 25, 2024

(30) Foreign Application Priority Data
Jun. 25, 2021   (EP) .................................... 21181800

(51) Int. Cl.
*F03D 1/06* (2006.01)
*B29C 70/08* (2006.01)
(Continued)

(52) U.S. Cl.
CPC .......... *F03D 1/0681* (2023.08); *B29C 70/081* (2013.01); *B29C 70/083* (2013.01);
(Continued)

(58) Field of Classification Search
CPC ... F03D 1/0681; F03D 1/0675; B29C 70/081; B29C 70/083; B29C 70/48;
(Continued)

(56) References Cited

U.S. PATENT DOCUMENTS 4,416,175 A * 11/1983 Bettner ................ B29C 70/302
428/105
9,545,757 B1 * 1/2017 Boone ................... B29C 70/302
(Continued)

FOREIGN PATENT DOCUMENTS

DE      102016009640 A1    2/2018
EP         2330292 A2      6/2011
(Continued)

OTHER PUBLICATIONS

Bendel et al. WO2018029240, English Machine Translation (Year: 2018).*

*Primary Examiner* — Nathaniel E Wiehe
*Assistant Examiner* — Wayne A Lambert
(74) *Attorney, Agent, or Firm* — Dority & Manning, P.A.

(57) ABSTRACT

The present invention relates to a spar cap for a wind turbine blade and a method for manufacturing said spar cap. The spar cap comprises: a plurality of reinforcing fibre layers comprising unidirectionally oriented reinforcement fibres, wherein the plurality of reinforcing fibre layers are arranged such that the spar cap tapers in thickness towards a first longitudinal end, and a number of first fibre skin layers arranged on a first surface of the plurality of reinforcing fibre layers, and a number of second fibre skin layers arranged on a second surface of the plurality of reinforcing fibre layers, such that the plurality of reinforcing fibre layers are arranged between the number of first fibre skin layers and the number of second fibre skin layers. The number of first fibre skin layers and the number of second fibre skin layers extend beyond the plurality of reinforcing fibre layers towards the
(Continued)

first longitudinal end of the spar cap, and the first longitudinal end of the spar cap is serrated along a transverse direction, forming a first serrated section.

24 Claims, 5 Drawing Sheets (51) Int. Cl.
    *B29C 70/48* (2006.01)
    *B29C 70/54* (2006.01)
    *B29D 99/00* (2010.01)
    *B32B 3/26* (2006.01)
    *B32B 5/02* (2006.01)
    *B32B 5/26* (2006.01)
    B29K 31/00 (2006.01)
    B29K 63/00 (2006.01)
    B29K 67/00 (2006.01)
    B29K 105/08 (2006.01)
    B29K 307/04 (2006.01)
    B29K 309/08 (2006.01)
    B29L 31/08 (2006.01)

(52) U.S. Cl.
    CPC ............ *B29C 70/48* (2013.01); *B29C 70/545* (2013.01); *B29D 99/0028* (2013.01); *B32B 3/263* (2013.01); *B32B 5/022* (2013.01); *B32B 5/024* (2013.01); *B32B 5/277* (2021.05); B29C 2793/009 (2013.01); B29K 2031/00 (2013.01); B29K 2063/00 (2013.01); B29K 2067/00 (2013.01); B29K 2105/0845 (2013.01); B29K 2105/0854 (2013.01); B29K 2307/04 (2013.01); B29K 2309/08 (2013.01); B29L 2031/085 (2013.01); B32B 2250/20 (2013.01); B32B 2260/023 (2013.01); B32B 2260/046 (2013.01); B32B 2262/02 (2013.01); B32B 2262/101 (2013.01); B32B 2262/106 (2013.01); B32B 2307/516 (2013.01); B32B 2603/00 (2013.01); F05B 2230/23 (2013.01); F05B 2240/3042 (2020.08); F05B 2280/6003 (2013.01)

(58) Field of Classification Search
    CPC ... B29C 70/545; B29C 70/302; B29C 70/443; B29C 70/446; B29C 2793/009; B29D 99/0028; B29D 99/0003; B29D 99/0025; B32B 3/263; B32B 5/022; B32B 5/024; B32B 5/277; B32B 2250/20; B32B 2260/023; B32B 2260/046; B32B 2262/02; B32B 2262/101; B32B 2262/106; B32B 2307/516; B32B 2603/00; B29K 2031/00; B29K 2063/00; B29K 2067/00; B29K 2105/0845; B29K 2105/0854; B29K 2307/04; B29K 2309/08; B29L 2031/085; F05B 2230/23; F05B 2240/3042; F05B 2280/6003; Y02E 10/72; Y02P 70/50

See application file for complete search history.

(56) References Cited

U.S. PATENT DOCUMENTS

| | | | |
|---|---|---|---|
| 10,919,256 B2 * | 2/2021 | Cheng | B29C 70/20 |
| 2008/0145615 A1 * | 6/2008 | Jacobsen | B32B 3/02 |
| | | | 83/869 |
| 2011/0135486 A1 * | 6/2011 | Bendel | F03D 1/065 |
| | | | 428/114 |
| 2011/0143081 A1 | 6/2011 | Fritz et al. | |
| 2012/0027609 A1 * | 2/2012 | Ogde | B29C 70/545 |
| | | | 29/889.71 |
| 2014/0003956 A1 * | 1/2014 | Lull | B29C 70/865 |
| | | | 416/230 |
| 2014/0065372 A1 * | 3/2014 | Olson | B32B 5/26 |
| | | | 428/166 |
| 2016/0273516 A1 * | 9/2016 | Smith | B29C 70/521 |
| 2017/0082087 A1 * | 3/2017 | Yarbrough | B29D 99/0028 |
| 2018/0156202 A1 * | 6/2018 | Lipka | F03D 80/30 |

FOREIGN PATENT DOCUMENTS

| | | | | |
|---|---|---|---|---|
| EP | 3424696 A1 | | 1/2019 | |
| GB | 2473020 A | * | 3/2011 | ............ B32B 5/245 |
| GB | 2601126 A | * | 5/2022 | ........ B29D 99/0025 |
| WO | WO-2006015598 A1 | * | 2/2006 | ............ B29C 70/30 |
| WO | 2011092486 A1 | | 8/2011 | |
| WO | 2015003713 A1 | | 1/2015 | |
| WO | WO-2017108692 A1 | * | 6/2017 | ........ B29C 66/7212 |
| WO | WO-2018029240 A1 | * | 2/2018 | ........... B29C 70/865 |

* cited by examiner

SPAR CAP WITH TAPERING AND SERRATED END SECTION

This is a National Phase Application filed under 35 U.S.C. 371 as a national stage of PCT/EP2022/067375, filed Jun. 24, 2022, an application claiming the benefit of European Application No. 21181800.0, filed Jun. 25, 2021, the content of each of which is hereby incorporated by reference in its entirety.

FIELD OF INVENTION

The present invention relates to a spar cap with a tapering and serrated end section. The present invention further relates to a wind turbine blade comprising said spar cap, a method of manufacturing said spar cap and a method of manufacturing a wind turbine blade comprising said spar cap.

BACKGROUND OF THE INVENTION

The blades of modern wind turbines capture kinetic wind energy by using sophisticated blade design created to maximise efficiency. A major trend in wind turbine development is the increase in size to reduce the leveraged cost of energy. There is an increasing demand for large wind blades which may exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between the two sides. The resulting lift force generates torque for producing electricity.

The shell halves of wind turbine blades are usually manufactured using blade moulds. First, a blade gel coat or primer is applied to the mould. Subsequently, fibre reinforcement material is placed into the mould in layers followed by arrangement of other elements within the shell halves, such as core elements, load-carrying spar caps, internal shear webs and the like. The resulting shell halves are resin infused and assembled by being glued or bolted together substantially along a chord plane of the blade.

The spar caps may comprise a plurality of carbon pultrusion elements and interlayers arranged between the carbon pultrusion elements. The spar caps may be produced directly in the wind turbine blade moulds or in a separate offline mould where they are resin infused and then subsequently lifted into the main blade shell mould which is then infused with resin.

Any prefabricated element, such as a prefabricated spar cap, needs to fulfil the design criteria for the element itself but also the surrounding materials, which often dry layup fabrics in the wind turbine blade shell. The nature of the double curved surface of wind turbine blades will inherently increase the panel stiffness, making incompliant geometries more pronounced and not easily corrected. It requires a huge force to make the fibre layers flat and avoid bumps in a subsequent fibre layup. Furthermore, irregularities and geometry deviations make it difficult to arrange an offline spar cap in a wind turbine blade shell and make it conform to the surface.

Hence, there is a need for improved spar caps or methods allowing spar caps to easily conform to layup surfaces in wind turbine blades, independent of panel stiffness curve, the local irregularities and geometry deviations of the layup surface.

SUMMARY OF DISCLOSURE

The present inventors have found that one or more of said objects may be achieved in a first aspect of the present invention relating to a spar cap for a wind turbine blade, wherein the spar cap extends in a longitudinal direction between a first longitudinal end and a second longitudinal end and further in a transverse direction between a first side and a second side, and wherein the spar cap comprises:
 a plurality of reinforcing fibre layers comprising unidirectionally oriented reinforcement fibres, wherein the plurality of reinforcing fibre layers are arranged such that the spar cap tapers in thickness towards the first longitudinal end, and
 a number of first fibre skin layers arranged on a first surface of the plurality of reinforcing fibre layers, and a number of second fibre skin layers arranged on a second surface of the plurality of reinforcing fibre layers, such that the plurality of reinforcing fibre layers are arranged between the number of first fibre skin layers and the number of second fibre skin layers, and
 wherein the number of first fibre skin layers and the number of second fibre skin layers extend beyond the plurality of reinforcing fibre layers towards the first longitudinal end of the spar cap, and
 wherein the first longitudinal end of the spar cap is serrated along the transverse direction, forming a first serrated section.

The spar cap according to the first aspect of the present invention is a spar cap made offline, i.e. a premanufactured spar cap made outside the wind turbine blade mould. The spar cap is manufactured with a first serrated section at the first longitudinal end to allow the first longitudinal end of the spar cap to easily conform to the fibre reinforcement material laid up in a turbine blade shell mould, independently of panel stiffness curve, local irregularities and geometry deviations of the fibre reinforcement material.

In some embodiments, the plurality of reinforcing fibre layers are arranged such that the spar cap tapers in thickness towards the second longitudinal end of the spar cap, the number of first fibre skin layers and the number of second fibre skin layers additionally extend beyond the plurality of reinforcing fibre layers towards the second longitudinal end of the spar cap and the second longitudinal end of the spar cap is serrated along the transverse direction, forming a second serrated section.

With both the first and second end parts of the spar being serrated, the spar cap will even more easily and individually conform to the fibre reinforcement material laid up in the turbine blade shell mould.

In some embodiments, the first serrated section is tapering towards the first longitudinal end of the spar cap and/or the second serrated section is tapering towards the second longitudinal end of the spar cap.

In some embodiments, an outermost part of the first longitudinal end of the spar cap consist of one or more of the number of first fibre skin layers and one or more of the number of second fibre skin layers, preferably only one or two fibre skin layers.

In some embodiments, an outermost part of the second longitudinal end of the spar cap consist of one or more of the number of first fibre skin layers and one or more of the number of second fibre skin layers, preferably only one or two fibre skin layers.

In some embodiments, the part of the number of first fibre skin layers and the part of the number of second fibre skin layers extending beyond the plurality of reinforcing fibre layers towards the first longitudinal end of the spar cap is defined as the first extending section of the spar cap, wherein the first fibre skin layer and the second fibre skin layer is arranged in the first extending section, in a way such that at least part of an inner surface of one of the first fibre skin layers is contacted with at least part of an inner surface of one of the second fibre skin layers, wherein the inner surface is the surface turning toward the plurality of reinforcing fibre layers.

In some embodiments, the part of the number of first fibre skin layers and the part of the number of second fibre skin layers extending beyond the plurality of reinforcing fibre layers towards the second longitudinal end of the spar cap is defined as the second extending section of the spar cap, wherein the first fibre skin layer and the second fibre skin layer is arranged in the second extending section, in a way such that at least part of an inner surface of one of the first fibre skin layers is contacted with at least part of an inner surface of one of the second fibre skin layers.

In some embodiments, the first serrated section is formed in the number of first fibre skin layers and in the number of second fibre skin layers only and/or the second serrated section is formed in the number of first fibre skin layers and in the number of second fibre skin layers only.

In some embodiments, the first serrated section is formed in the number of first fibre skin layers and in the number of second fibre skin layers and further extends into one or more of the plurality of reinforcing fibre layers, such as into one, two or three of the plurality of reinforcing fibre layers, arranged most proximal to the first longitudinal end of the spar cap and/or the second serrated section is formed in the number of first fibre skin layers and in the number of second fibre skin layers and further extends into one or more of the plurality of reinforcing fibre layers, such as into one, two or three of the plurality of reinforcing fibre layers, arranged most proximal to the second longitudinal end of the spar cap.

In some embodiments, the first serrated section comprises a plurality of serrations, including a first serration having two first serration sides meeting in a first serration tip, wherein the angle between the two first serration sides are between 20-90 degrees, such as between 25-70 degrees, such as 60 degrees or such as 45 degrees, preferably 30 degrees. A serrations angle around 30 degrees makes the serration more robust for local fiber misalignment caused by varying chamfer quality. In some embodiments, the first serrated section has a maximum thickness between 0.5 mm and 1 cm, such as between 0.5 mm and 5 mm, such as between 0.5 mm and 3 mm, such as between 0.5 mm and 2 mm. The thickness of the first serrated section depends on the specific type of first and second fibre skin layers used and also on the number of first and second fibre skin layers. Each fibre skin layer is preferably around 0.3-0.5 mm in thickness. Thus, a serrated end part consisting of a first and second fibre skin layer contacted with each other would be around 0.6-1.0 mm in areas where they overlap. However, if further skin fibre layers are present, the thickness may be greater.

In some embodiments, the second serrated section comprises a plurality of serrations, including a second serration having two second serration sides meeting in a second serration tip, wherein the angle between the two second serration sides are between 20-90 degrees, such as between 25-70 degrees, such as 60 degrees or such as 45 degrees, preferably 30 degrees. A serrations angle around 30 degrees makes the serration more robust for local fiber misalignment caused by varying chamfer quality. In some embodiments, the second serrated section has a maximum thickness between 0.5 mm and 1 cm, such as between 0.5 mm and 5 mm, such as between 0.5 mm and 3 mm, such as between 0.5 mm and 2 mm. The thickness of the second serrated section depends on the specific type of first and second fibre skin layers used and also on the number of first and second fibre skin layers. Each fibre skin layer is preferably around 0.3-0.5 mm in thickness. Thus, a serrated end part consisting of a first and second fibre skin layer contacted with each other would be around 0.6-1.0 mm. However, if further skin fibre layers are present, the thickness may be greater.

Preferably, each serration of the first serrated section and/or second serrated section comprises two serration sides meeting in a serration tip, wherein the angle between the two serration sides is between 20-90 degrees, such as between 25-70 degrees, such as 60 degrees or such as 45 degrees, preferably 30 degrees. A serrations angle around 30 degrees makes the serration more robust for local fiber misalignment caused by varying chamfer quality. Preferably, each serration of the first serrated section and/or second serrated section has a maximum thickness between 0.5 mm and 1 cm, such as between 0.5 mm and 5 mm, such as between 0.5 mm and 3 mm, such as between 0.5 mm and 2 mm. The thickness of the first and second serrated end part depends on the specific type of first and second fibre skin layers used and also on the number of first and second fibre skin layers. Each fibre skin layer is preferably around 0.3-0.5 mm in thickness. Thus, a serrated end part consisting of a first and second fibre skin layer contacted with each other, would be around 0.6-1.0 mm. However, if further skin fibre layers are present, the thickness may be greater.

In some embodiments, the number of serrations along the first and/or second serrated section are more than 10, such as between 10-200, such as between 10 and 100, such as between 10 and 50, such as between 10 and 30.

The serration geometry may vary. The serrations may have sharp edges but preferable the serrations have a rounding at the serration tip and bottom.

In some embodiments, the distribution of serrations along the first and/or second longitudinal edge of the spar cap is even. In other embodiments, the distribution of serrations along the first and/or second longitudinal edge of the spar cap is uneven. In some embodiments, the size i.e. length and width of each serration is the same along the first and/or second longitudinal end of the spar cap. However, in other embodiments, the length and width of each serration differ. In still other embodiments, some serrations have the same width and length, while others have different widths and lengths. By "width" of a serration is meant the maximum distance between the two serration sides. By "length" of a serration is meant the distance from the serration tip to the base of the serration. The base of a serration corresponds to the maximum "width" of a serration.

In some embodiments, the first serration tip is part of the first longitudinal end of the spar cap and/or the second serration tip is part of the second longitudinal end of the spar cap.

The outermost part of the first longitudinal end of the spar cap includes the tip of the serrations in the serrated section. Thus, in some embodiments, an outermost part of the first serrated section i.e., at least the serration tips, of the spar cap consist of one or more of the number of first fibre skin layers and one or more of the number of second fibre skin layers, preferably only one or two fibre skin layers. In some embodiments, an outermost part of the second serrated section i.e., at least the serration tips, of the spar cap consist of one or more of the number of first fibre skin layers and one or more of the number of second fibre skin layers, preferably only one or two fibre skin layers. The outmost part of the serrated section will never comprise one or more of the plurality of reinforcing fibre layers.

In some embodiments, the number of first fibre skin layers are arranged more distal to the first longitudinal end of the spar cap than the number of second fibre skin layers, whereby the number of first fibre skin layers and the number of second fibre skin layers are arranged such that the spar cap tapers in thickness towards the first longitudinal end of the spar cap. In some embodiments, the number of first fibre skin layers are arranged more distal to the second longitudinal end of the spar cap than the number of second fibre skin layers, whereby the number of first fibre skin layers and the number of second fibre skin layers are arranged such that the spar cap tapers in thickness towards the second longitudinal end of the spar cap.

In some embodiments, the number of second fibre skin layers includes a primary second fibre skin layer, wherein a first end of the primary second fibre skin layer is part of the first longitudinal end of the spar cap and/or a second end of the primary second fibre skin layer is part of the second longitudinal end of the spar cap.

In some embodiments, the number of first fibre skin layers is between 1 and 3 and the number of second fibre skin layers are between 1 and 3.

In some embodiments, the number of first fibre skin layers and/or the number of second fibre skin layers comprises glass fibres.

In some embodiments, one or more of the number of first fibre skin layers and/or one or more of the number of second fibre skin layers are biaxial glass fibre layers or glass fibre mats. In some embodiments, biaxial fibre layers comprise a first and a second fibre sheet arranged on top of each other and being stitched, woven or tacked together. The first fibre sheet comprising unidirectionally arranged glass fibres extending in a first direction and the second fibre sheet comprising unidirectionally arranged glass fibres extending in a second direction. The angle between the first and second direction is preferably 90 degrees, and the stitch direction is preferably between the first and second fibre direction. In some embodiments, the glass fibre matt comprises randomly arranged fibres in a matrix stitched together or held together by binding agent.

In some embodiments, the unidirectionally oriented reinforcement fibres in the plurality of reinforcing fibre layers comprises carbon fibres and/or glass fibres.

The number of reinforcing fibre layers arranged between the first fibre skin layer and the second fibre skin layer is preferably between 5-200, such as between 10-100, such as between 20-80, such as 25 or 40 or 60.

In some embodiments, the plurality of reinforcing fibre layers is composed of longitudinally extending precured fibre reinforced composite elements, such as pultruded planks, i.e. pultrusions. The precured fibre reinforced composite elements may also be formed by other processes than pultrusion, such as extrusion or other methods.

In some embodiments, the plurality of reinforcing fibre layers are stacked and includes a first reinforcing fibre layer most proximal to the number of first fibre skin layers, a second reinforcing fibre layer most proximal to the number of second fibre skin layers and a plurality of intermediate reinforcing fibre layers arranged between the first and second reinforcing fibre layers.

In some embodiments, the spar cap tapers in thickness towards the first longitudinal end of the spar cap because a first end of the first reinforcing fibre layer is arranged more distal to the first longitudinal end of the spar cap than a first end of the second reinforcing fibre layer and because a first end of each of the plurality of intermediate reinforcing fibre layers are arranged with increasing proximity to the first longitudinal end of the spar cap from the first reinforcing fibre layer to the second reinforcing fibre layer. In some embodiments, the spar cap tapers in thickness towards the second longitudinal end of the spar cap because a second end of the first reinforcing fibre layer is arranged more distal to the second longitudinal end of the spar cap than the second end of the second reinforcing fibre layer and because a first end of each of the plurality of intermediate reinforcing fibre layers are arranged with increasing proximity to the second longitudinal end of the spar cap from the first reinforcing fibre layer to the second reinforcing fibre layer. This may be achieved by the plurality of reinforcing fibre layers having varying lengths, with the first reinforcing fibre layer having the shortest length and the second reinforcing fibre layer having the greatest length. In other embodiments, this is achieved by the plurality of reinforcing fibre layers having the same length but being displaced relative to each other in the longitudinal direction.

In some embodiments, the distance between the first end of adjacent reinforcing fibre layers is between 0-500 cm, preferably between 5 and 50 cm, more preferably between 5 and 20 cm, such as between 5 and 15 cm. In that way, the plurality of reinforcing fibre layers tapers towards the first longitudinal end of the spar cap. In some embodiments, the distance between the second end of adjacent reinforcing fibre layers is between 0-500 cm, preferably between 5 and 50 cm, more preferably between 5 and 20 cm, such as between 5 and 15 cm. In that way, the plurality of reinforcing fibre layers tapers towards the second longitudinal end of the spar cap.

In some embodiments, each of the plurality of reinforcing fibre layers comprises a plurality of precured fibre reinforced composite elements arranged adjacent to each other.

In some embodiments, the precured fibre reinforced composite elements are arranged in an array comprising a plurality of fibre reinforced element stacks each comprising a plurality of precured fibre reinforced composite elements arranged on top of each other and wherein the plurality of precured fibre reinforced element stacks are arranged adjacent to each other.

In some embodiments, the spar cap further comprises a plurality of interlayers arranged between the reinforcing fibre layers.

In some embodiments, the interlayers are woven or nonwoven fabrics each comprising or essentially consisting of fibres such as glass fibres and/or polymeric filaments and/or carbon fibres and wherein the interlayer optionally further comprises binding agent or a thread for holding or stitching the fibres together, respectively.

In some embodiments, the spar cap is embedded in a cured resin and wherein the cured resin is preferably vinyl ester resin or epoxy ester resin or polyester resin or polyurethane or a thermoplastic resin. However, the cured resin may also be another type of resin.

In a second aspect, the present invention relates to a wind turbine blade comprising a premanufactured spar cap according to the first aspect of the present invention.

The wind turbine blade comprises two joined blade shell members made of a plurality of fibre reinforcement layers and resin. The wind turbine blade may further comprise other reinforcing elements, such as core material and shear webs. A spar cap is preferably arranged within a blade shell member of the wind turbine blade such that the longitudinal direction of the spar cap is substantially parallel with a longitudinal direction of the blade shell member. A spar cap may be arranged in each of the two blade shell members, i.e. the wind turbine blade according to the second aspect of the present invention preferably comprises two spar caps according to the first aspect of the present invention.

In a third aspect, the present invention relates to a method of manufacturing a spar cap according to the first aspect of the present invention, wherein the spar cap extends in a longitudinal direction between a first longitudinal end and a second longitudinal end and further in a transverse direction between a first side and a second side, wherein the method comprises the steps of:
- a) providing a spar cap mould, a plurality of reinforcing fibre layers comprising unidirectionally oriented reinforcement fibres, a number of first fibre skin layers and a number of second fibre skin layers;
- b) arranging the number of first fibre skin layers on a moulding surface of the spar cap mould;
- c) arranging the plurality of reinforcing fibre layers on top of the number of first fibre skin layers, such that a first surface of the plurality of reinforcing fibre layers are facing towards the number of first fibre skin layers, wherein the plurality of reinforcing fibre layers are arranged such that the spar cap tapers in thickness towards the first longitudinal end;
- d) arranging the number of second fibre skin layers on top of the plurality of reinforcing fibre layers, such that a second surface of the plurality of reinforcing fibre layers are facing towards the number of second fibre skin layers, and
- e) infusing the spar cap mould with a resin and curing the resin;

wherein the number of first fibre skin layers and the number of second fibre skin layers are arranged such that they extend beyond the plurality of reinforcing fibre layers towards the first longitudinal end of the spar cap, and wherein the first longitudinal end of the spar cap is serrated along the transverse direction, forming a first serrated section.

In some embodiments, the plurality of reinforcing fibre layers are arranged such that the spar cap tapers in thickness towards the second longitudinal end and wherein the number of first fibre skin layers and the number of second fibre skin layers are arranged such that they additionally extend beyond the plurality of reinforcing fibre layers towards the second longitudinal end of the spar cap and wherein the second longitudinal end of the spar cap is serrated along the transverse direction, forming a second serrated section.

In some embodiments, the first serrated section is tapering towards the first longitudinal end of the spar cap and/or wherein the second serrated section is tapering towards the second longitudinal end of the spar cap.

In some embodiments, the number of first fibre skin layers and the number of second fibre skin layers are premanufactured with a first serrated section and/or a second serrated section.

In some embodiments, the plurality of reinforcing fibre layers and/or the number of first fiber skin layers and/or the number of second fibre skin layers are premanufactured with the first serrated section and/or the second serrated section This is advantageous to avoid cutting the serrated section after the spar cap is made and for better drapeablity of fibre layers/planks over the mould surface.

In some embodiments, the plurality of reinforcing fibre layers are pultruded planks. In some embodiments, the pultruded planks are premanufactured/prefabricated with serrations. This is advantageous to avoid cutting the serrated section after the spar cap is made and for better drapeablity of fibre layers/planks over the mould surface.

In some embodiments, the method comprises a step of cutting the first longitudinal end of the spar cap after the step of infusing the spar cap with resin and curing the resin to form the first serrated section and/or wherein the method comprises a step of cutting the second longitudinal end of the spar cap after the step of infusing the spar cap with resin and curing the resin to form the second serrated section.

In some embodiments, the step of cutting the first longitudinal end of the spar cap and/or the step of cutting the second longitudinal end of the spar cap comprises cutting in the number of first fibre skin layers and in the number of second fibre skin layers only, i.e. no cutting into the fibre reinforcing layers.

In some embodiments, the step of cutting the first longitudinal end of the spar cap and/or the step of cutting the second longitudinal end of the spar cap comprises cutting in the number of first fibre skin layers and in the number of second fibre skin layers, as well as in part of one or more of the reinforcing fibre layers, such as in one, two or three of the plurality of reinforcing fibre layers, arranged most proximal to the first longitudinal end or most proximal to the second longitudinal end of the spar cap, respectively.

In some embodiments, the spar cap is removed from the spar cap mould before the step of cutting the first serrated section and/or the second serrated section.

In some embodiments, step c) further comprises arranging a plurality of interlayers between the reinforcing fibre layers, the interlayers being configured for promoting resin flow through the interlayers and between the reinforcing fibre layers.

In a fourth aspect, the present invention relates to a method of manufacturing a blade shell member for a wind turbine blade, the method comprising the steps of:
- a) providing a blade mould for the blade shell member,
- b) arranging a number of fibre-reinforcement layers on a blade moulding surface;
- c) providing a pre-manufactured spar cap according to a first aspect of the present invention with the method according to the third aspect of the present invention,
- d) arranging the pre-manufactured spar cap on the number of fibre-reinforcement layers;
- e) infusing the mould cavity with resin; and
- f) curing the resin to form the blade shell member.

The fibre-reinforcement layers arranged on the blade moulding surface will become the outer shell of the blade shell member. Thus, preferably the fibre-reinforcement layers should cover the entire moulding surface. The number of fibre-reinforcement layers are between 1-100, preferably between 5-50, such as between 10-40.

In some embodiments, the step of arranging the number of fibre-reinforcement layers on the blade moulding surface comprises arranging each of the number of fibre-reinforcement layers on top of each other.

In some embodiments, the step of arranging the number of fibre-reinforcement layers on the blade moulding surface comprises arranging a plurality of preforms, each comprising a consolidated stack of fibre-reinforcement layers, on the moulding surface. Preferably, the plurality of preforms together covers the entire moulding surface. The use of preforms may be advantageous, especially when manufacturing very large blade shell members, since wrinkles in the fibre-reinforcement layers may be reduced.

In some embodiments, the number of fibre-reinforcement layers comprises glass fibres and/or carbon fibres and wherein the number of fibre-reinforcement layers comprises unidirectional layers and/or biaxial layers and/or triaxial layers.

In some embodiments, the blade mould cavity is infused with polyester resin and/or vinyl ester resin and/or epoxy ester resin and/or wherein the step of infusing the blade mould with resin is based on vacuum-assisted resin transfer moulding.

In some embodiments, the method further comprises the step of arranging further elements, such as sandwich core layers and/or further fibre-reinforcement layers in the blade mould before the blade mould is infused with resin.

According to the method of the present invention, the blade mould is infused with resin and cured to form the blade shell member.

In some embodiments, the step of infusing the blade mould with resin is based on vacuum-assisted resin transfer moulding (VARMT). When the desired elements have been arranged in the blade mould, a vacuum bag may be arranged on top of the elements arranged on the moulding surface and the vacuum bag may be sealed against the blade mould. Then, the blade mould within the sealed vacuum bag may be infused with resin. Optionally, the step of resin infusion is followed by curing to obtain the finished blade shell member.

In some embodiments, the blade mould cavity is infused with polyester resin. In other embodiments, the blade mould cavity is infused with epoxy ester resin or vinyl ester resin. Polyester resin is much cheaper than conventionally used resins, such as epoxy ester and vinyl ester.

In a fifth aspect, the present invention relates to a method of manufacturing a wind turbine blade according to the fourth aspect of the present invention, comprising the steps of manufacturing a pressure side shell half and a suction side shell half over substantially the entire length of the wind turbine blade in accordance with the fourth aspect of the present invention and subsequently closing and joining the shell halves for obtaining a closed shell.

It will be understood that any of the features described in relation to the spar cap can also be applied to the blade shell member or wind turbine blade comprising such a spar cap. Furthermore, embodiments and features described with regard to the spar cap, blade shell member and wind turbine blade can also apply to the method of manufacturing a blade shell member with such a spar cap and to the method of manufacturing a wind turbine blade with such a spar cap, and vice versa.

DETAILED DESCRIPTION OF THE INVENTION

The invention is explained in detail below with reference to embodiments shown in the drawings, in which.

DETAILED DESCRIPTION

Figure 1:
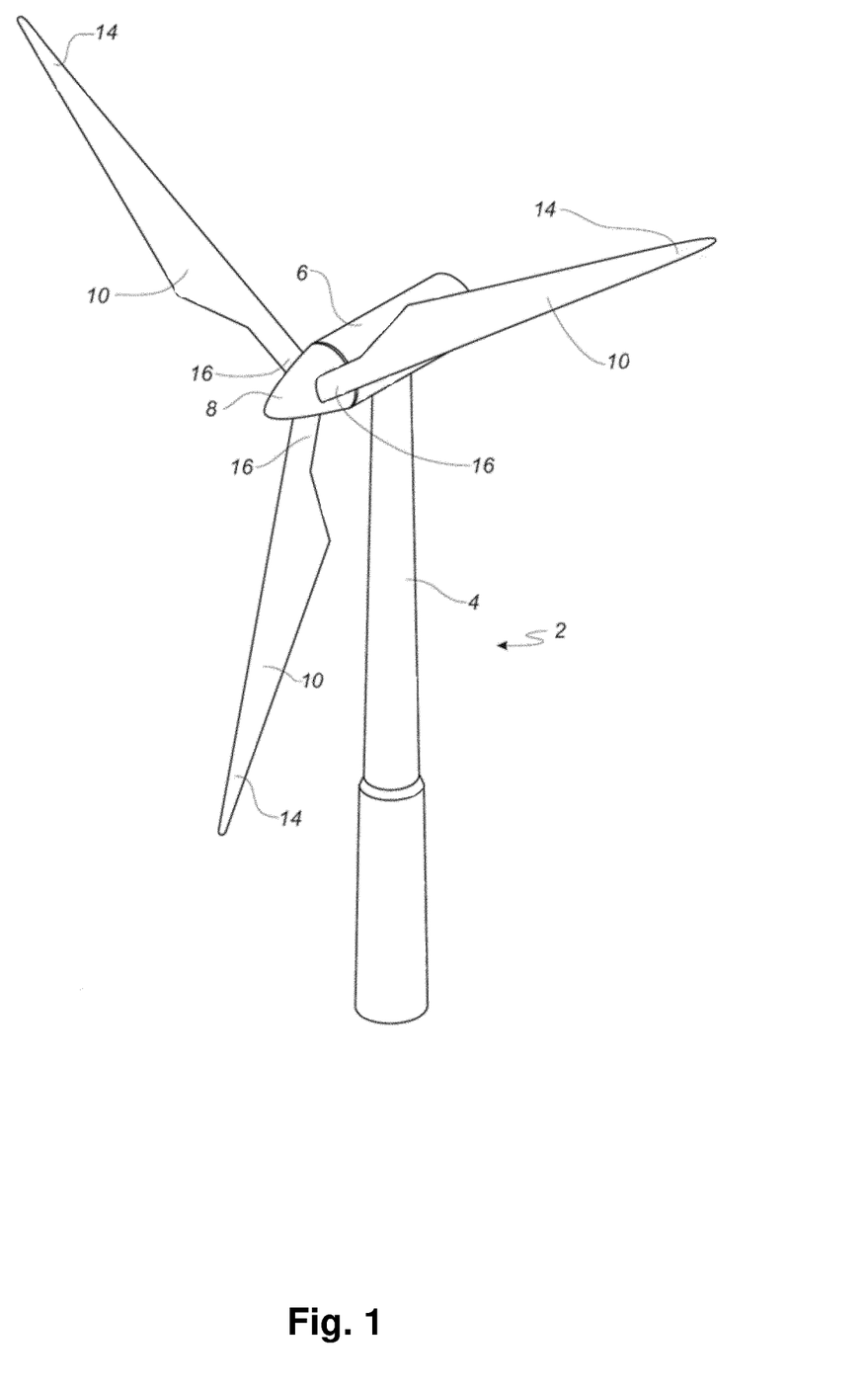
FIG. 1 is a schematic diagram illustrating a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
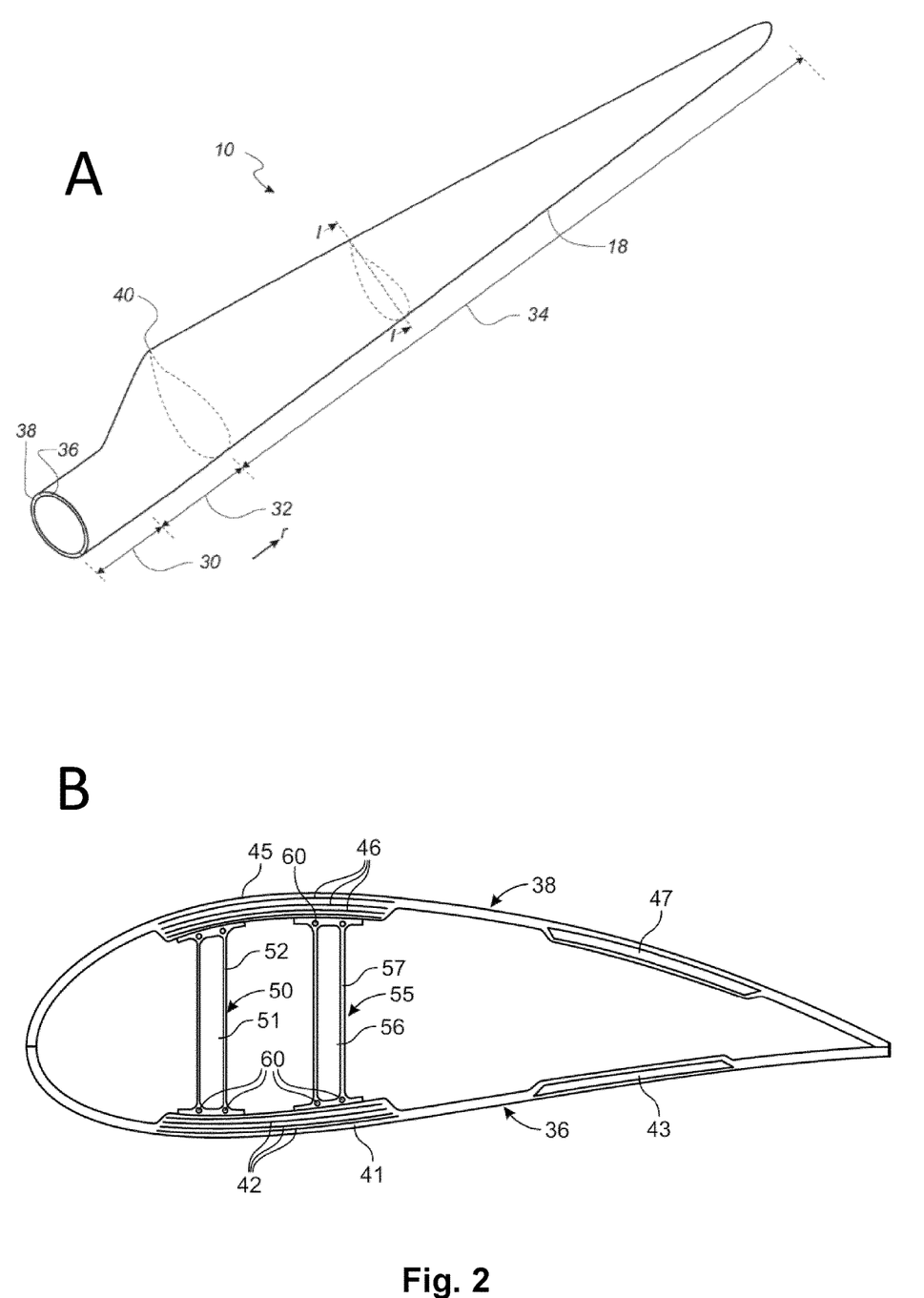
FIG. 2 is a schematic diagram illustrating a wind turbine blade and a spar cap structure arranged within the wind turbine blade.

FIG. 2A shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2A also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 2B shows a schematic view of a cross section of the blade along the line I-I shown in FIG. 2A. As previously mentioned, the blade 10 comprises a pressure side shell part 36 and a suction side shell part 38. The pressure side shell part 36 and suction side shell part may be made from a plurality of fibre reinforcement layers (not shown), The pressure side shell part 36 comprises a first spar cap 41, also called a main laminate, which constitutes a load bearing part of the pressure side shell part 36. The first spar cap comprises a plurality of first reinforcing fibre layers 42 arranged on top of each other. The suction side shell part 38 comprises a second spar cap 45 comprises a plurality of second reinforcing fibre layers 46 arranged on top of each other. The pressure side shell part 36 may also comprise a first sandwich core material 43 typically made of balsawood or foamed polymer and sandwiched between the first plurality of fibre reinforcement layers. The first sandwich core material 43 is used to provide stiffness to the shell in order to ensure that the shell substantially maintains its aerodynamic profile during rotation of the blade. Similarly, the suction side shell part 38 may comprise a second sandwich core material 47.

The first spar cap 41 of the pressure side shell part 36 and the second spar cap 45 of the suction side shell part 38 are connected via a first shear web 50 and a second shear web 55. The shear webs 50, 55 are in the shown embodiment shaped as substantially I-shaped webs. The first and second shear webs 50, 55 each comprises a shear web body and two web foot flanges. The shear web body comprises a sandwich core material 51, 56, such as balsawood or foamed polymer, covered by a number of skin layers 52, 57 made of a number of fibre layers. The blade shells 36, 38 may comprise further fibre reinforcement at the leading edge 18 and the trailing edge 16. Typically, the shell parts 36, 38 are bonded to each other via glue flanges.

FIG. 3A is a schematic diagram illustrating a three-dimensional view of part of a spar cap 41, 45 according to an embodiment of the present invention. Only part of the spar cap is shown in FIG. 3A. The total length is not shown.

The spar cap 41,45 is for a wind turbine blade 10 and extends in a longitudinal direction 100 between a first longitudinal end 101 and a second longitudinal end 102 and further in a transverse direction 103 between a first side 104 and a second side 105. Furthermore, the spar cap 41,45 have a thickness. As can be seen in FIG. 3A, the spar cap 41,45 tapers in thickness towards the first longitudinal end 101. This is because the spar cap comprises a plurality of reinforcing fibre layers 110 (not visible in FIG. 3A, see FIG. 3B-3D) arranged such that the spar cap 41,45 tapers in thickness towards the first longitudinal end 101. In FIG. 3A, the first longitudinal end 101 of the spar cap 41,45 is serrated along the transverse direction 103, forming a first serrated section 130 which is also tapering towards the first longitudinal end 101 of the spar cap 41,45.

The first serrated section 130 comprises three serrations 132 each having two first serration sides 133 meeting in a first serration tip 134. The angle between the two first serration sides 133 are approximately 30 degrees. The serration tips 134 forms part of the first longitudinal end 101 of the spar cap 41,45. Even though the number of serrations 132 along the first serrated section 130 are three in FIG. 3A, this is only for illustrative purposes. Preferably, the first serrated section 130 comprises more than 10, such as between 10-200 serrations 132.

As mentioned above, the spar cap 41,45 comprises a plurality of reinforcing fibre layers 110. The plurality of reinforcing fibre layers 110 comprises unidirectionally oriented reinforcement fibres. Furthermore, the spar cap comprises a number of first fibre skin layers 113 arranged on a first side of the plurality of reinforcing fibre layers 110, and a number of second fibre skin layers 114 arranged on a second side of the plurality of reinforcing fibre layers 110. This is not visible in FIG. 3A. However, FIGS. 3B and 3C are schematic diagrams illustrating two different embodiments of a cross-sectional view through the length of the spar cap 41,45 in FIG. 3A where the plurality of reinforcing fibre layers 110 and the first and second fibre skin layers 113, 114 can be seen.

Figure 3:
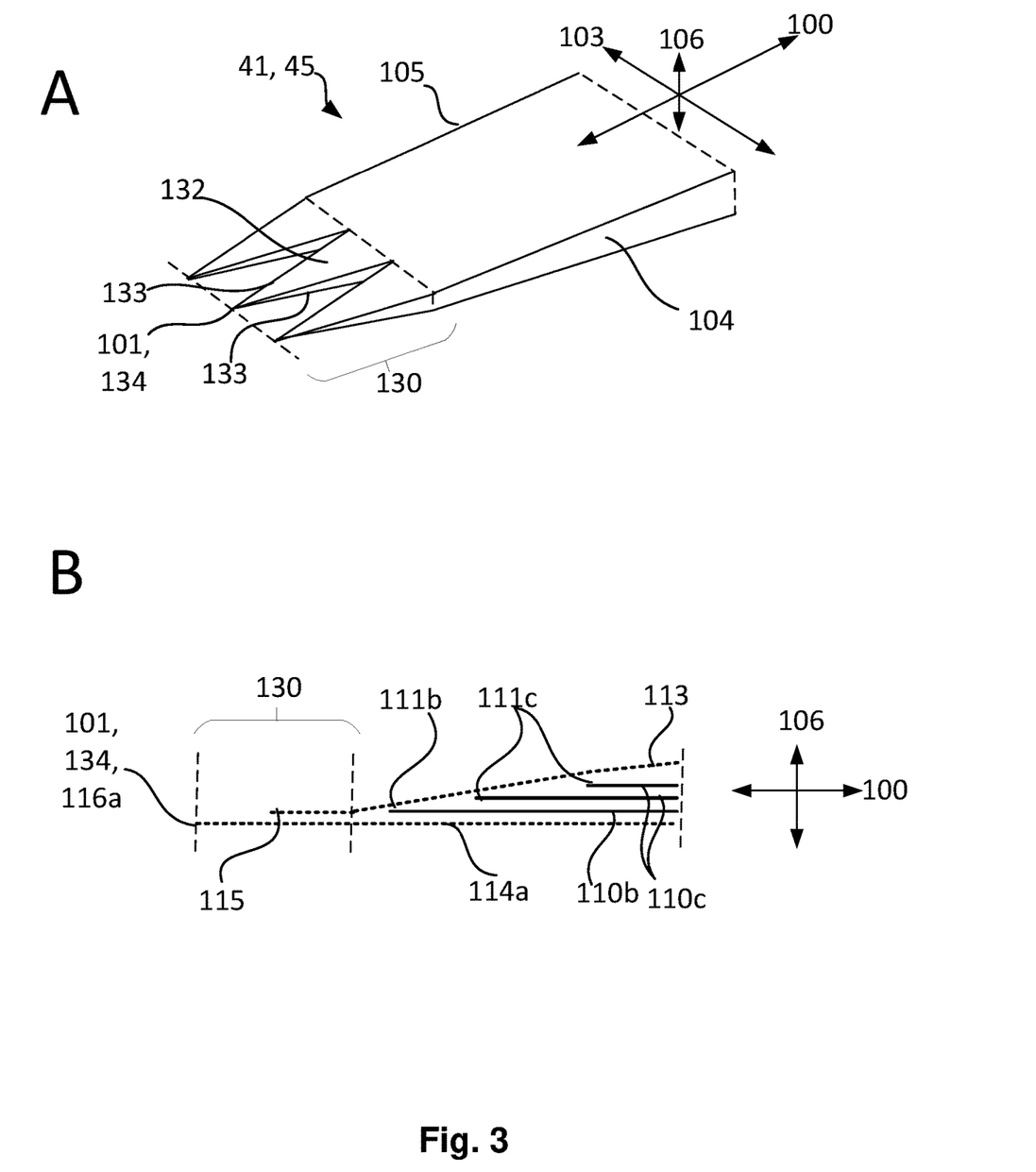
FIG. 3 is a schematic diagram illustrating embodiments of a spar cap according to the present invention.

In FIG. 3B, three reinforcing fibre layers can be seen, including a second reinforcing fibre layer 110b most proximal to the second fibre skin layer 114 and two intermediate reinforcing fibre layers 110c arranged between a first reinforcing fibre layer 110a (not visible in FIG. 3) most proximal to the first fibre skin layer 113 and the second reinforcing fibre layer 110b. The spar cap 41, 45 tapers in thickness towards the first longitudinal end of the spar cap 101 because a first end 111b of the second reinforcing fibre layer 110b is arranged more proximal to the first longitudinal end of the spar cap 101 than a first end 111a of the first reinforcing fibre layer 110a (not visible) and because a first end 111c of each of the plurality of intermediate reinforcing fibre layers 110c are arranged with increasing proximity to the first longitudinal end of the spar cap 101 from the first reinforcing fibre layer 110a to the second reinforcing fibre layer 110b. The distance Furthermore, it can be seen that a first fibre skin layer 113 is arranged on a first side of the plurality of reinforcing fibre layers 110, and a second fibre skin layer 114 is arranged on a second side of the plurality of reinforcing fibre layers 110. The first fibre skin layer 113 and the second fibre skin layer 114 further extend beyond the plurality of reinforcing fibre layers 110 towards the first longitudinal end 101 of the spar cap 41,45. The first fibre skin layer 113 is arranged more distal to the first longitudinal end 101 of the spar cap 41,45 than the second fibre skin layer 114, whereby the number of first fibre skin layers 113 and the number of second fibre skin layers 114 are also arranged such that the spar cap 41,45 tapers in thickness towards the first longitudinal end 101 of the spar cap 41,45.

In FIG. 3B, the first serrated section 130 is formed in the number of first fibre skin layers 113 and in the number of second fibre skin layers 114 only. Thus, the maximum thickness of the serrated section 130 in the embodiment of FIG. 3B is the thickness of two fibre skin layers 113, 114 and the minimum thickness is that of a single fibre skin layer 113, 114.

In FIG. 3C, three reinforcing fibre layers can be seen, including a second reinforcing fibre layer 110b most proximal to the second fibre skin layer 114 and two intermediate reinforcing fibre layers 110c arranged between a first reinforcing fibre layer 110a (not visible in FIG. 3) most proximal to the first fibre skin layer 113 and the second reinforcing fibre layer 110b. The spar cap 41, 45 tapers in thickness towards the first longitudinal end of the spar cap 101 because a first end 111b of the second reinforcing fibre layer 110b is arranged more proximal to the first longitudinal end of the spar cap 101 than a first end 111a of the first reinforcing fibre layer 110a (not visible) and because a first end 111c of each of the plurality of intermediate reinforcing fibre layers 110c are arranged with increasing proximity to the first longitudinal end of the spar cap 101 from the first reinforcing fibre layer 110a to the second reinforcing fibre layer 110b. Furthermore, it can be seen that two first fibre skin layers 113 are arranged on a first side of the plurality of reinforcing fibre layers 110, and one second fibre skin layer 114 is arranged on a second side of the plurality of reinforcing fibre layers 110. The two first fibre skin layers 113 and the second fibre skin layer 114 further extend beyond the plurality of reinforcing fibre layers 110 towards the first longitudinal end 101 of the spar cap 41,45. The two first fibre skin layers 113 are arranged more distal to the first longitudinal end 101 of the spar cap 41,45 than the second fibre skin layer 114. Furthermore, one of the first fibre skin layers 113 are arranged more distal to the first longitudinal end 101 of the spar cap 41,45 than the other first fibre skin layer 113. Thus, the number of first fibre skin layers 113 and the number of second fibre skin layers 114 are also arranged such that the spar cap 41,45 tapers in thickness towards the first longitudinal end 101 of the spar cap 41,45.

In FIG. 3C, the first serrated section 130 is formed in the two first fibre skin layers 113 and in the second fibre skin layer 114 and further extends into two of the reinforcing fibre layers, namely the second reinforcing fibre layer 110b and the intermediate reinforcing fibre layer 110c most proximal to the second reinforcing fibre layer 110b. Thus, the maximum thickness of the serrated section 130 in the embodiment of FIG. 3B is the thickness of three fibre skin layers 113, 114 plus two fibre reinforcing layers 110 and at least one interlayer 122 arranged between the fibre reinforcing layers 110. Again, the minimum thickness is that of a single fibre skin layer 113, 114. However, in other embodiments, the minimum thickness could be more than the thickness of one fibre skin layer. In such cases, the first longitudinal end would be formed by two fibre skin layers arranged such that their first end are not displaced relative to each other.

The outermost part of the first longitudinal end of the spar cap includes the tip of the serrations in the serrated section.

In FIGS. 3B and 3C, a first end 116 of the second fibre skin layer 114 forms the first longitudinal end 101 of the spar cap 41,45. In both embodiments, an outermost part of the serrated section i.e., the serration tips 134, of the spar cap consist of the second fibre skin layer 114a. However, in other embodiments, the outermost part of the serrated section 134 may consist of one or more of the number of first fibre skin layers 113 and one or more of the number of second fibre skin layers 114, preferably only one or two fibre skin layers 113, 114. The outmost part of the serrated section 134 will never comprise one or more of the plurality of reinforcing fibre layers 110.

FIG. 3D is a schematic diagram illustrating a cross-sectional view through the width of an embodiment of a spar cap 41,45 according to the present invention. The width is defined between the first and second side 104, 105 of the spar cap 41,45.

In the embodiment shown in FIG. 3D, the spar cap 41,45 comprises three stacked reinforcing fibre layers. Furthermore, the spar cap comprises a first fibre skin layer 113 arranged on a first surface of the three fibre reinforcing layers 110a, 110b, 110c and a second fibre skin layer 114 is arranged on a second surface of the three fibre reinforcing layers 110a, 110b, 110c. Furthermore, the spar cap 41,45 comprises three interlayers 122 arranged between the three reinforcing fibre layers 110.

The three reinforcing fibre layers includes a first reinforcing fibre layer 110a arranged most proximal to the first fibre skin layer 113, a second reinforcing fibre layer 110b arranged most proximal to the second fibre skin layer 114 and an intermediate reinforcing fibre layers 110c arranged between a first reinforcing fibre layer 110a and the second reinforcing fibre layer 110b. The three fibre reinforcing layers 110a, 110b, 110c are each composed of three longitudinally extending precured fibre reinforced composite elements 120, such as pultruded planks. Thus, the precured fibre reinforced composite elements 120 are arranged in an array comprising three fibre reinforced element stacks 121 arranged adjacent to each other. Each fibre reinforced element stack 121 comprising three precured fibre reinforced composite elements 120 arranged on top of each other.

The spar cap 41,45 is embedded in a cured resin (not visible in FIG. 3D) for adhering the reinforcing fibre layers 110 as well as the first fibre skin layer 113 and second fibre skin layer 114 to each other. The interlayers 122 are woven or non-woven fabrics each comprising or essentially consisting of fibres configured for promoting resin flow between the reinforcing fibre layers 110.

FIG. 4A is a schematic diagram illustrating a top view of a spar cap 41,45 according to an embodiment of the present invention and FIG. 4B is a schematic diagram illustrating a side view of the spar cap 41,45 in FIG. 4A.

The spar cap 41,45 illustrated in FIGS. 4A and 4B is for a wind turbine blade 10 and extends in a longitudinal direction 100 between a first longitudinal end 101 and a second longitudinal end 102 and further in a transverse direction 103 between a first side 104 and a second side 105 as can be seen in FIG. 4A. Furthermore, the spar cap 41,45 have a thickness. As can be seen in FIG. 4B, the spar cap 41,45 tapers in thickness towards the first longitudinal end 101 and towards the second longitudinal end 102. This is because the plurality of reinforcing fibre layers 110 are arranged such that the spar cap 41,45 tapers in thickness towards the first longitudinal end 101 and the second longitudinal end 102. Furthermore, as can be seen in FIG. 4A, the first longitudinal end 101 and the second longitudinal end 102 of the spar cap 41,45 are serrated along the transverse direction 103, forming a first serrated section 130 and a second serrated section 131.

In FIG. 4A, both the first and the second serrated section 130, 131 comprises six serrations 132 each having two first serration sides 133 meeting in a first serration tip 134. The angle between the two first serration sides are approximately 30 degrees. The serration tips 134 forms part of the first longitudinal end 101 of the spar cap 41,45.

The spar cap 41,45 comprises a plurality of reinforcing fibre layers 110 comprising unidirectionally oriented reinforcement fibres, a number of first fibre skin layers 113 arranged on a first side of the plurality of reinforcing fibre layers 110, and a number of second fibre skin layers 114 arranged on a second side of the plurality of reinforcing fibre layers 110. Only the first fibre skin layer 113 can be seen in FIG. 4A. However, FIG. 4D is a schematic diagrams illustrating an embodiment of a cross-sectional view through the length of the spar cap 41,45 in FIGS. 4A and 4B, where the arrangement of the plurality of reinforcing fibre layers 110 and the first and second fibre skin layers 113, 114 can be seen.

In FIG. 4D, twenty-one reinforcing fibre layers 110 comprising unidirectionally oriented reinforcement fibres can be seen. The twenty-one reinforcing fibre layers 110 are stacked and includes a first reinforcing fibre layer 110a most proximal to the number of first fibre skin layers 113, a second reinforcing fibre layer 110b most proximal to the number of second fibre skin layers and nineteen intermediate reinforcing fibre layers 110c arranged between the first and second reinforcing fibre layer 110a, 110b.

Furthermore, it can be seen that two first fibre skin layers 113 are arranged on a first side of the plurality of reinforcing fibre layers 110, and one second fibre skin layer is arranged on a second side of the plurality of reinforcing fibre layers 110. The first fibre skin layer 113 and the second fibre skin layer 114 further extend beyond the plurality of reinforcing fibre layers 110 towards the first longitudinal end 101 of the spar cap 41,45.

The spar cap 41,45 tapers in thickness towards the first longitudinal end 101 of the spar cap 41,45 because a first end 111b of the second reinforcing fibre layer 110b is arranged more proximal to the first longitudinal end 101 of the spar cap 41,45 than a first end 111a of the first reinforcing fibre layer 110a and because a first end 111c of each of the plurality of intermediate reinforcing fibre layers 110c are arranged with decreasing proximity to the first longitudinal end 101 of the spar cap 41,45 from the second reinforcing fibre layer 110b to the first reinforcing fibre layer 110a. This is achieved by the plurality of reinforcing fibre layers 110a, 110b, 110c having varying lengths, with the first reinforcing fibre layer 110a having the shortest length and the second reinforcing fibre layer having the greatest length 110b. Furthermore, there is a distance between a first end 111a, 111b, 111c of adjacent reinforcing fibre layers 110a, 110b, 110c.

Furthermore, two first fibre skin layer 113 are arranged more distal to the first longitudinal end 101 of the spar cap 41,45 than the second fibre skin layer 114 and one of the first fibre skin layers 113 are arranged more distal to the first longitudinal end 101 of the spar cap 41,45 than the other first fibre skin layer 113. Thus, the number of first fibre skin layers 113 and the number of second fibre skin layers 114 are also arranged such that the spar cap 41,45 tapers in thickness towards the first longitudinal end 101 of the spar cap 41,45.

In FIG. 4D, it can be seen that the first serrated section 130 is formed in the two first fibre skin layers 113 and in the number of second fibre skin layers 114 only. Thus, the first serrated section 130 tapers towards the first longitudinal end 101 due to the arrangement of the first and second fibre skin layers 113, 114. Thus, the maximum thickness of the first serrated section 130 in the embodiment of FIG. 4D is the thickness of three fibre skin layers 113, 114 and the minimum thickness is that of a single fibre skin layer 113, 114.

Figure 4:
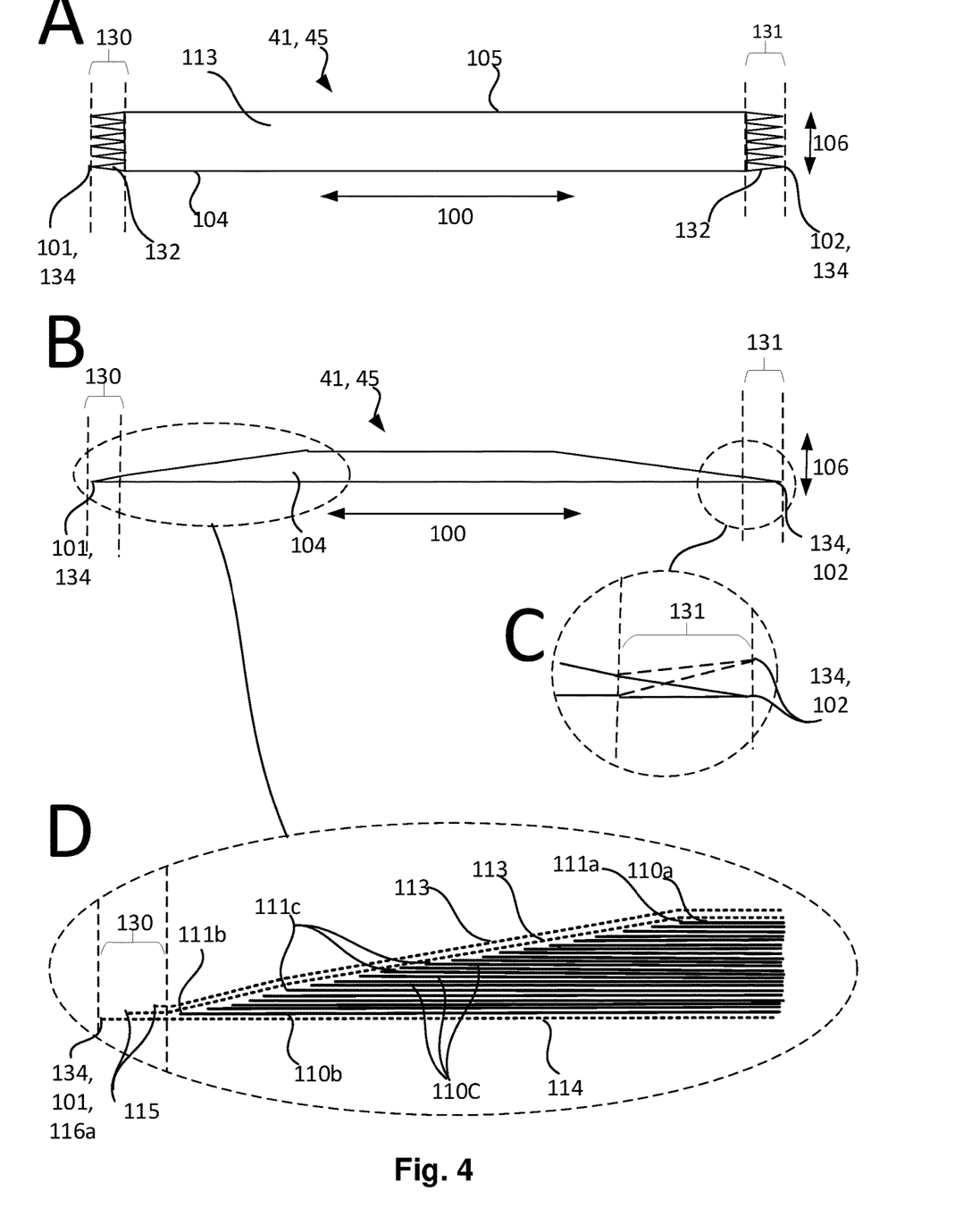
FIG. 4 is a schematic diagram illustrating embodiments of a spar cap according to the present invention.

In FIG. 4, a first end 116 of the second fibre skin layer 114 forms the first longitudinal end 101 of the spar cap 41,45. The first end 116 of the second fibre skin layer 114 also forms the serration tip 134 of each of the serrations 132 in the first serrated part 130.

FIG. 4C is a schematic diagram illustrating a close-up view of the second serrated section 131 in FIG. 4B. Due to the tapering configuration of the spar cap 41,45 towards the second longitudinal end 102 and the second serrated section 131, the second longitudinal end 102 of the spar cap 41,45 is pliable and can easily conform to a surface with inconsistencies. The same applies for the first longitudinal end of the spar cap 41,45 illustrated in FIG. 4C.

The spar cap 41,45 according to the present invention, is a spar cap 41,45 made offline, i.e. a premanufactured spar cap 41,45 made outside the wind turbine blade mould. As illustrated in FIGS. 3 and 4, the spar cap 41,45 is manufactured with at least a first serrated section 130 at the first longitudinal end 101 of the spar cap 41,45. This is to allow the first longitudinal end 101 of the spar cap 41,45 to easily conform to the fibre reinforcement material laid up in the turbine blade shell mould before arranging the spar cap 41,45 therein, independently of panel stiffness curve, local irregularities and geometry deviations of the fibre reinforcement material laid up in the turbine blade shell mould. However, in preferred embodiments and as illustrated in FIGS. 4A and 4B, the spar cap 41,45 comprises a serrated section at each longitudinal end 101 of the spar cap 41,45. A spar cap 41,45 comprising two serrated sections 130, 131 will even more easily conform to the fibre reinforcement material laid up in the turbine blade shell mould than a spar cap 41,45 with only a first serrated section.

It should be emphasized that the dimensions in the schematic illustrations of FIGS. 3 and 4 are exaggerated for illustrative purposes.

LIST OF REFERENCE NUMERALS 4 tower
6 nacelle
8 hub
wind turbine blade
14 blade tip
16 blade root
18 leading edge
20 trailing edge
30 root region
32 transition region
34 airfoil region
36 pressure side shell part
38 suction side shell part
39 fibre reinforcement layers
40 shoulder
41 first spar cap
42 first reinforcing fibre layers
43 first sandwich core material
45 second spar cap
46 second reinforcing fibre layers
47 second sandwich core material
50 first shear web
51 sandwich core material of first shear web
52 skin layer of first shear web
55 second shear web
56 sandwich core material of second shear web
57 skin layers of second shear web
100 longitudinal direction
101 first longitudinal end of spar cap
102 second longitudinal end of spar cap
103 transverse direction
104 first side of spar cap
105 second side of spar cap
106 thickness direction
110 reinforcing fibre layer
110a first reinforcing fibre layer
110b second reinforcing fibre layer
110c intermediate reinforcing fibre layer
111a first end of first reinforcing fibre layer
111b first end of second reinforcing fibre layer
111c first end of intermediate reinforcing fibre layer
112a second end of first reinforcing fibre layer
112b second end of second reinforcing fibre layer
112c second end of intermediate reinforcing fibre layer
113 first fibre skin layer
114 second fibre skin layer
114a primary second fibre skin layer
115 first end of first fibre skin layer
116 first end of second fibre skin layer
116a first end of primary second fibre skin layer
117 second end of first fibre skin layer
118 second end of second fibre skin layer
118a second end of primary second fibre skin layer
120 precured fibre reinforced element e.g., pultruded plank
121 precured fibre reinforced element stack
122 interlayer
130 first serrated section
131 second serrated section
132 serration
133 serration side
134 serration tip

The invention claimed is:

1. A spar cap for a wind turbine blade, wherein the spar cap extends in a longitudinal direction between a first longitudinal end and a second longitudinal end and further in a transverse direction between a first side and a second side, and wherein the spar cap comprises:
a plurality of reinforcing fibre layers comprising unidirectionally oriented reinforcement fibres, wherein the plurality of reinforcing fibre layers are arranged such that the spar cap tapers in thickness towards the first longitudinal end; and
a number of first fibre skin layers arranged on a first surface of the plurality of reinforcing fibre layers, and a number of second fibre skin layers arranged on a second surface of the plurality of reinforcing fibre layers, such that the plurality of reinforcing fibre layers are arranged between the number of first fibre skin layers and the number of second fibre skin layers, wherein the number of first fibre skin layers and the number of second fibre skin layers extend beyond the plurality of reinforcing fibre layers towards the first longitudinal end of the spar cap, wherein the first longitudinal end of the spar cap is serrated along the transverse direction forming a first serrated section, and wherein the first serrated section comprises a plurality of serrations, wherein each of the serrations is formed by at least two of the reinforcing fibre layers, the number of first fibre skin layers, and the number of second fibre skin layers, such that each of the serrations is tapered towards the first longitudinal end by reducing a total number of the at least two of the reinforcing fibre layers, the number of first fibre skin layers, and the number of second fibre skin layers towards the first longitudinal end.

2. The spar cap according to claim 1, wherein the plurality of reinforcing fibre layers are arranged such that the spar cap tapers in thickness towards the second longitudinal end and wherein the number of first fibre skin layers and the number of second fibre skin layers additionally extend beyond the plurality of reinforcing fibre layers towards the second longitudinal end of the spar cap, and wherein the second longitudinal end of the spar cap is serrated along the transverse direction forming a second serrated section.

3. The spar cap according to claim 2, wherein the first serrated section is tapering towards the first longitudinal end of the spar cap and/or wherein the second serrated section is tapering towards the second longitudinal end of the spar cap.

4. The spar cap according to claim 1, wherein an outermost part of the first longitudinal end of the spar cap consists of one or more of the number of first fibre skin layers and one or more of the number of second fibre skin layers, and/or wherein an outermost part of the second longitudinal end of the spar cap consist of one or more of the number of first fibre skin layers and one or more of the number of second fibre skin layers.

5. The spar cap according to claim 1, wherein a part of the number of first fibre skin layers and a part of the number of second fibre skin layers extending beyond the plurality of reinforcing fibre layers towards the first longitudinal end of the spar cap is defined as a first extending section of the spar cap, wherein the first fibre skin layer and the second fibre skin layer are arranged in the first extending section such that at least part of an inner surface of one of the first fibre skin layers is contacted with at least part of an inner surface of one of the second fibre skin layers, wherein the inner surface is the surface turning toward the plurality of reinforcing fibre layers and/or wherein the part of the number of first fibre skin layers and the part of the number of second fibre skin layers extending beyond the plurality of reinforcing fibre layers towards the second longitudinal end of the spar cap is defined as a second extending section of the spar cap, wherein the first fibre skin layer and the second fibre skin layer are arranged in the second extending section such that at least part of an inner surface of one of the first fibre skin layers is contacted with at least part of an inner surface of one of the second fibre skin layers.

6. The spar cap according to claim 2, wherein the first serrated section is formed in the number of first fibre skin layers and in the number of second fibre skin layers only and/or wherein the second serrated section is formed in the number of first fibre skin layers and in the number of second fibre skin layers only or wherein the first serrated section is formed in the number of first fibre skin layers and in the number of second fibre skin layers and further extends into one or more of the plurality of reinforcing fibre layers, arranged most proximal to the first longitudinal end of the spar cap and/or wherein the second serrated section is formed in the number of first fibre skin layers and in the number of second fibre skin layers and further extends into one or more of the plurality of reinforcing fibre layers, arranged most proximal to the second longitudinal end of the spar cap.

7. The spar cap according to claim 2, wherein the first serrated section comprises a plurality of serrations, including a first serration having two first serration sides meeting in a first serration tip, wherein the angle between the two first serration sides are between 20-90 degrees, and wherein the first serrated section have a maximum thickness between 0.5 mm and 1 cm and/or wherein the second serrated section comprises a plurality of serrations, including a second serration having two second serration sides meeting in a second serration tip, wherein the angle between the two second serration sides are between 20-90 degrees, and wherein the second serrated section have a maximum thickness between 0.5 mm and 1 cm.

8. The spar cap according to claim 2, wherein an outermost part of the first serrated section of the spar cap consists of one or more of the number of first fibre skin layers and one or more of the number of second fibre skin layers, and/or wherein an outermost part of the second serrated section of the spar cap consists of one or more of the number of first fibre skin layers and one or more of the number of second fibre skin layers.

9. The spar cap according to claim 2, wherein the number of serrations along the first and/or the second serrated section comprises at least 5 serrations.

10. The spar cap according to claim 1, wherein the number of first fibre skin layers are arranged more distal to the first longitudinal end of the spar cap than the number of second fibre skin layers, whereby the number of first fibre skin layers and the number of second fibre skin layers are arranged such that the spar cap tapers in thickness towards the first longitudinal end of the spar cap and/or wherein the number of first fibre skin layers are arranged more distal to the second longitudinal end of the spar cap than the number of second fibre skin layers, whereby the number of first fibre skin layers and the number of second fibre skin layers are arranged such that the spar cap tapers in thickness towards the second longitudinal end of the spar cap.

11. The spar cap according to claim 1, wherein one or more of the number of first fibre skin layers and/or one or more of the number of second fibre skin layers are biaxial glass fibre layers or glass fibre mats.

12. The spar cap according to claim 1, wherein the unidirectionally oriented reinforcement fibres in the plurality of reinforcing fibre layers comprises carbon fibres and/or glass fibres and/or wherein the plurality of reinforcing fibre layers are composed of longitudinally extending precured fibre reinforced composite elements.

13. The spar cap according to claim 1, wherein the spar cap further comprises a plurality of interlayers arranged between the reinforcing fibre layers, wherein the interlayers are woven or non-woven fabrics each comprising or essentially consisting of fibres.

14. The spar cap according to claim 1, wherein the spar cap is embedded in a cured resin.

15. A wind turbine blade comprising the spar cap according to claim 1.

16. A method of manufacturing the spar cap according to claim 1, wherein the spar cap extends in a longitudinal direction between a first longitudinal end and a second longitudinal end and further in a transverse direction between a first side and a second side, wherein the method comprises the steps of:
  a) providing a spar cap mould, a plurality of reinforcing fibre layers comprising unidirectionally oriented reinforcement fibres, a number of first fibre skin layers and a number of second fibre skin layers;
  b) arranging the number of first fibre skin layers on a moulding surface of the spar cap mould;
  c) arranging the plurality of reinforcing fibre layers on top of the number of first fibre skin layers, such that a first surface of the plurality of reinforcing fibre layers are facing towards the number of first fibre skin layers, wherein the plurality of reinforcing fibre layers are arranged such that the spar cap tapers in thickness towards the first longitudinal end;
  d) arranging the number of second fibre skin layers on top of the plurality of reinforcing fibre layers, such that a second surface of the plurality of reinforcing fibre layers are facing towards the number of second fibre skin layers; and
  e) infusing the spar cap mould with a resin and curing the resin,
  wherein the number of first fibre skin layers and the number of second fibre skin layers are arranged such that they extend beyond the plurality of reinforcing fibre layers towards the first longitudinal end of the spar cap, and
  wherein the first longitudinal end of the spar cap is serrated along the transverse direction forming a first serrated section, and
  wherein the first serrated section comprises a plurality of serrations, wherein each of the serrations is formed by at least two of the reinforcing fibre layers, the number of first fibre skin layers, and the number of second fibre skin layers, such that each of the serrations is tapered towards the first longitudinal end by reducing a total number of the at least two of the reinforcing fibre layers, the number of first fibre skin layers, and the number of second fibre skin layers towards the first longitudinal end.

17. The method according to claim 16, wherein the plurality of reinforcing fibre layers are arranged such that the spar cap tapers in thickness towards the second longitudinal end and wherein the number of first fibre skin layers and the number of second fibre skin layers are arranged such that they additionally extend beyond the plurality of reinforcing fibre layers towards the second longitudinal end of the spar cap and wherein the second longitudinal end of the spar cap is serrated along the transverse direction forming a second serrated section.

18. The method according to claim 17, wherein the method comprises a step of cutting the first longitudinal end of the spar cap after the step of infusing the spar cap with resin and curing the resin to form the first serrated section and/or wherein the method comprises a step of cutting the second longitudinal end of the spar cap after the step of infusing the spar cap with resin and curing the resin to form the second serrated section.

19. A method of manufacturing a blade shell member for a wind turbine blade, the method comprising the steps of:
  a) providing a blade mould for the blade shell member;
  b) arranging a number of fibre-reinforcement layers on a blade moulding surface;
  c) providing the spar cap according to claim 1;
  d) arranging the spar cap on the number of fibre-reinforcement layers;
  e) infusing the mould cavity with resin; and
  f) curing the resin to form the blade shell member.

20. A method of manufacturing a wind turbine blade, comprising the steps of:
  manufacturing a pressure side shell half and a suction side shell half over substantially the entire length of the wind turbine blade, wherein each of the pressure side shell half and the suction side shell half is manufactured in accordance with the method of manufacturing a blade shell member of claim 19; and
  closing and joining the pressure side and suction side shell halves to obtain a closed shell.

21. A spar cap for a wind turbine blade, wherein the spar cap extends in a longitudinal direction between a first longitudinal end and a second longitudinal end and further in a transverse direction between a first side and a second side, and wherein the spar cap comprises:
  a plurality of reinforcing fibre layers comprising unidirectionally oriented reinforcement fibres, wherein the plurality of reinforcing fibre layers are arranged such that the spar cap tapers in thickness towards the first longitudinal end; and
  a number of first fibre skin layers arranged on a first surface of the plurality of reinforcing fibre layers, and a number of second fibre skin layers arranged on a second surface of the plurality of reinforcing fibre layers, such that the plurality of reinforcing fibre layers are arranged between the number of first fibre skin layers and the number of second fibre skin layers,
  wherein the number of first fibre skin layers and the number of second fibre skin layers extend beyond the plurality of reinforcing fibre layers towards the first longitudinal end of the spar cap,
  wherein the first longitudinal end of the spar cap is serrated along the transverse direction forming a first serrated section, and
  wherein the first serrated section is formed in the number of first fibre skin layers and in the number of second fibre skin layers and further extends into one or more of the plurality of reinforcing fibre layers arranged most proximal to the first longitudinal end of the spar cap.

22. The spar cap for a wind turbine blade according to claim 1,
  wherein the plurality of serrations include a first serration having two first serration sides meeting in a first serration tip, wherein an angle between the two first serration sides are between 20° and 90°.

23. A spar cap for a wind turbine blade, wherein the spar cap extends in a longitudinal direction between a first longitudinal end and a second longitudinal end and further in a transverse direction between a first side and a second side, and wherein the spar cap comprises:
  a plurality of reinforcing fibre layers comprising unidirectionally oriented reinforcement fibres, wherein the plurality of reinforcing fibre layers are arranged such that the spar cap tapers in thickness towards the first longitudinal end; and
  a number of first fibre skin layers arranged on a first surface of the plurality of reinforcing fibre layers, and a number of second fibre skin layers arranged on a second surface of the plurality of reinforcing fibre layers, such that the plurality of reinforcing fibre layers are arranged between the number of first fibre skin layers and the number of second fibre skin layers, wherein the number of first fibre skin layers and the number of second fibre skin layers extend beyond the plurality of reinforcing fibre layers towards the first longitudinal end of the spar cap, wherein the first longitudinal end of the spar cap is serrated along the transverse direction forming a first serrated section, and wherein the number of first fibre skin layers are arranged more distal to the first longitudinal end of the spar cap than the number of second fibre skin layers, whereby the number of first fibre skin layers and the number of second fibre skin layers are arranged such that the spar cap and serrations of the first serrated section taper in thickness towards the first longitudinal end of the spar cap and/or wherein the number of first fibre skin layers are arranged more distal to the second longitudinal end of the spar cap than the number of second fibre skin layers, whereby the number of first fibre skin layers and the number of second fibre skin layers are arranged such that the spar cap and the serrations taper in thickness towards the second longitudinal end of the spar cap.

24. The spar cap according to claim 13, wherein the interlayer further comprises a binding agent or a thread for holding or stitching the fibres together, respectively.

* * * * *